Oct. 17, 1944.  C. A. BERGMAN  2,360,389
VALVE
Filed Dec. 29, 1942  3 Sheets-Sheet 1
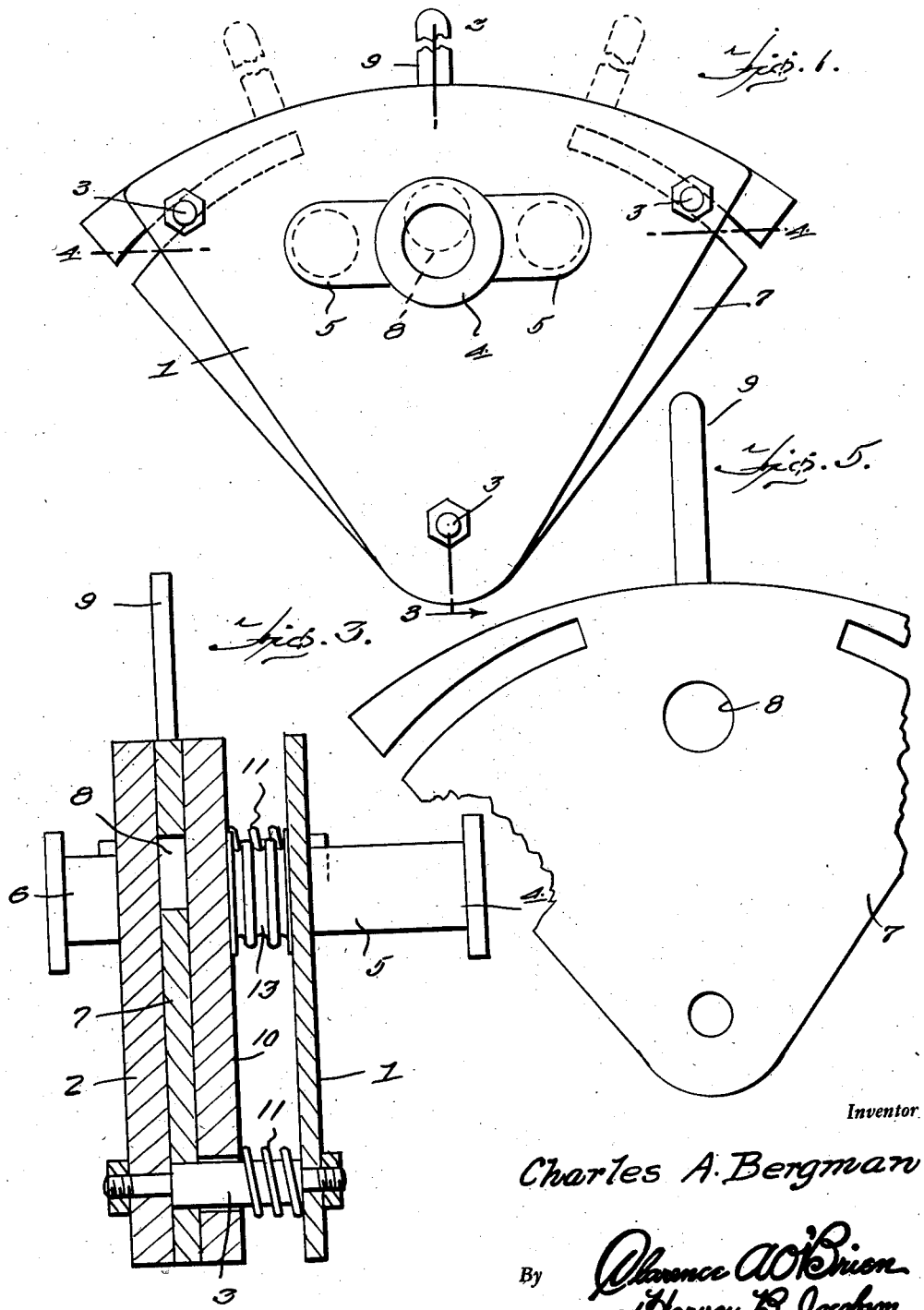
Inventor
Charles A. Bergman
By Clarence A. O'Brien
and Harvey B. Jacobson
Attorneys

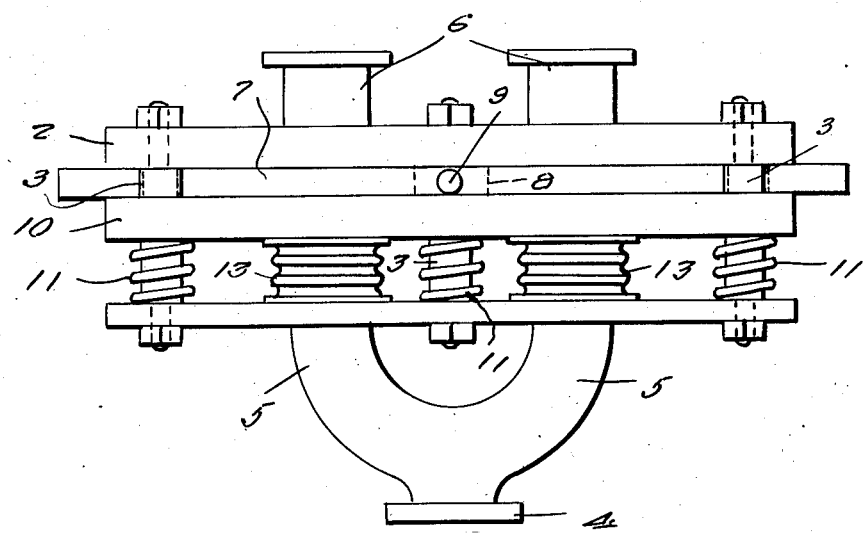
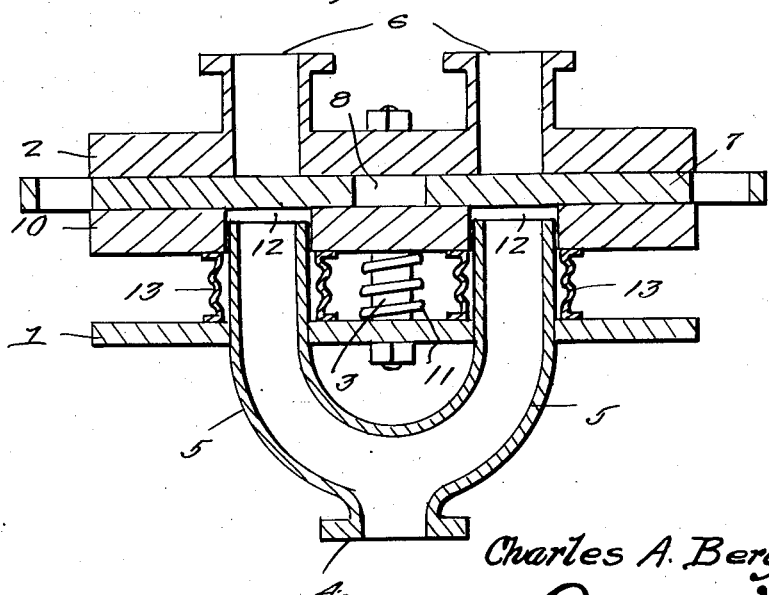

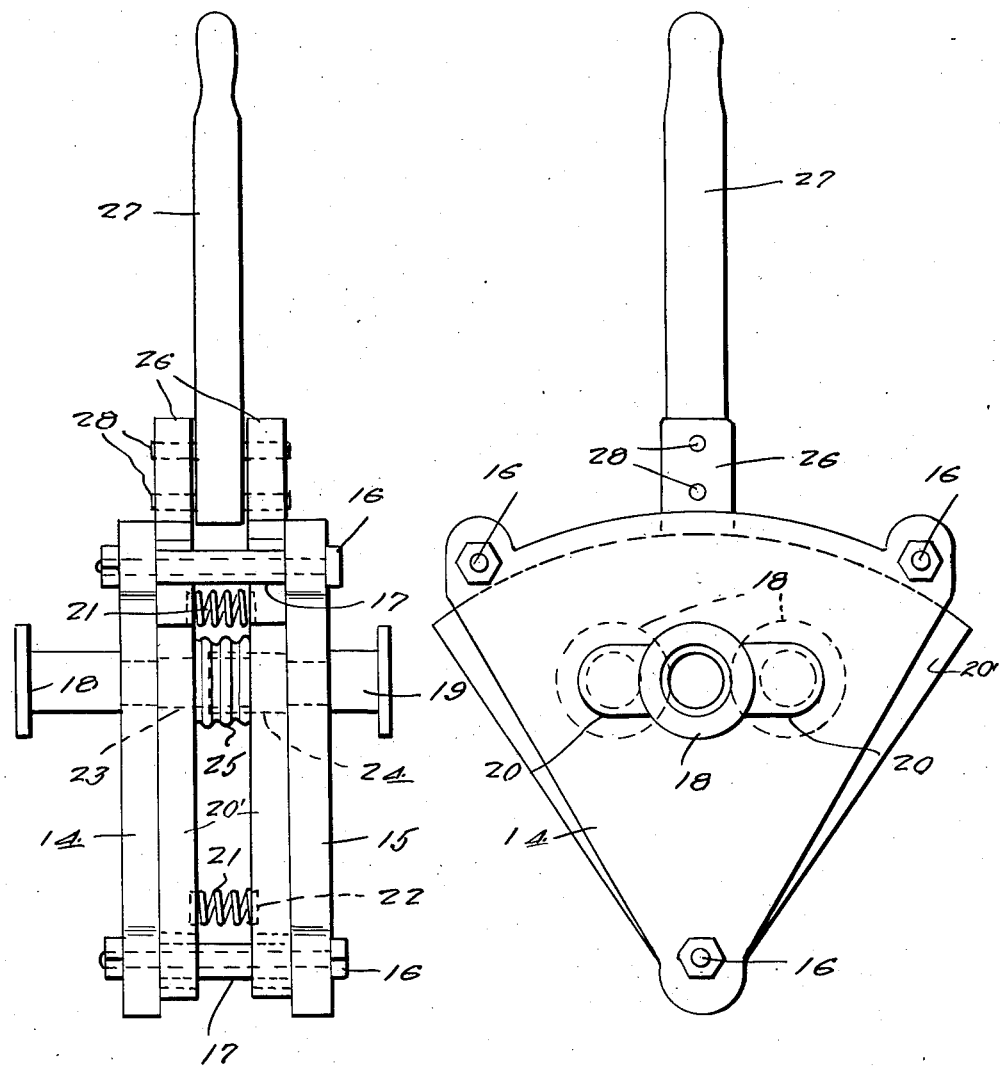

Patented Oct. 17, 1944

2,360,389

UNITED STATES PATENT OFFICE 2,360,389

VALVE

Charles A. Bergman, Birmingham, Ala.

Application December 29, 1942, Serial No. 470,501

3 Claims. (Cl. 251—18)

The present invention relates to new and useful improvements in multi-way valves, particularly for controlling the flow of pulverized coal to burners, although it will be understood, of course, that the device may be used for any other purpose for which it may be found adapted.

The primary object of the invention is to provide, in a manner as hereinafter set forth, a valve of the character described which will be self-cleaning, whereby the accumulation of material between the stationary and moving parts will be prevented, thus assuring free operation at all times.

Another very important object of the invention is to provide a valve of the aforementioned character comprising a novel construction for preventing leakage.

Other objects of the invention are to provide a valve of the character set forth which will be comparatively simple in construction, strong, durable, highly efficient and reliable in use, compact, and which may be manufactured at low cost.

All of the foregoing, and still further objects and advantages of the invention will become apparent from a study of the following specification, taken in connection with the accompanying drawings wherein like characters of reference designate corresponding parts throughout the several views, and wherein:

Figure 1 is a view in front elevation of a valve constructed in accordance with the present invention.

Figure 2 is a top plan view thereof.

Figure 3 is a vertical sectional view, taken substantially on the line 3—3 of Figure 1.

Figure 4 is a view in horizontal section, taken substantially on the line 4—4 of Figure 1.

Figure 5 is a detail view in elevation of the swinging valve member.

Figure 6 is a view in side elevation of another form of the invention.

Figure 7 is a view in front elevation of the modification.

Referring now to the drawings in detail, and to Figures 1 to 5, inclusive, thereof, in particular, it will be seen that reference numerals 1 and 2 designate, respectively, substantially triangular metallic front and back plates of suitable metal. Shouldered stud bolts 3 secure the plates 1 and 2 together in spaced, opposed relation.

Mounted on the plate 1 is an intake manifold 4, the branches 5 of which extend through said plate. Spaced outlets 6 for connection to the burners (not shown) project from the plate 2. The outlets 6 are aligned with the branches 5 of the intake manifold 4 for communication therewith.

Journaled for swinging movement on the lower stud bolt 3 and slidably engaged with the inner face of the plate 2 is a substantially segmental valve member 7 which controls communication between the outlets 6 and the branches 5 of the intake manifold 4. The swinging valve member 7 has formed therein an opening or port 8 for registry with either of the aligned members 5 and 6. An operating handle 9 projects from the free end of the valve member 7.

Loosely mounted on the stud bolts 3 between the plate 1 and the valve member 7 is a substantially triangular intermediate plate 10. Coil springs 11 on the stud bolts 3 yieldingly urge the plate 10 against the valve member 7 and said valve member 7 against the plate 2. The plate 10 has formed therein openings 12 which are aligned with the outlets 6 and into which the branches 5 of the intake manifold 4 project, as illustrated to advantage in Figure 4 of the drawings. It will be observed that there is sufficient clearance or space between the walls of the openings 12 and the intake manifold branches 5 to permit the plate 10 to move slightly in any direction. Resilient, longitudinally extensible sealing rings 13 prevent leakage from the intake manifold branches 5 between the plates 1 and 10.

It is thought that the operation of the valve will be readily apparent from a consideration of the foregoing. Briefly, with the swinging valve member 7 in its intermediate or vertical position, as shown in the drawings, both of the outlets 6 are out of communication with the manifold branches 5 and the valve is closed. To cause the pulverized coal to flow to either of the burners, the valve member 7 is simply swung, through the medium of the operating handle 9, in the correct direction to align the port 8 with the proper outlet 6 and the correct branch of the intake manifold 4. The floating mounting of the intermediate plate 10 and the sliding mounting of the valve member 7 on the stud bolts 3 permits such movement of these parts when the valve is operated as will prevent the accumulation of coal dust and other matter, which accumulation frequently causes valves in use at present to stick and to otherwise function inefficiently.

In the embodiment illustrated in Figures 6 and 7 of the drawings, plates 14 and 15 are connected by bolts 16. Spacers 17 are provided on the bolts 16 between the plates 14 and 15.

Mounted on the plate 14 is an intake manifold 18. Outlets 19 are mounted on the plate 15 for communication with the branches 20 of the manifold 18.

Loosely and slidably mounted on the lowermost spacer 17 is a pair of spaced, opposed swinging valve members 20' which control the communication between the outlets 19 and the manifold 18. Coil springs 21 are mounted between the valve members 20' for yieldingly urging said members outwardly against the inner faces of the plates 14 and 15. Sockets 22 in the opposed faces of the swinging valve members 20' accommodate the end portions of the coil springs 21.

Male and female tubes 23 and 24, respectively, are mounted on the valve members 20' for alignment with either of the outlets 19. There is sufficient play between the male and female tubes 23 and 24 to permit independent movement of the valve members 20'. Encircling the tubes 23 and 24 and extending between the valve members 20' is a resilient, extensible sealing ring 25 for preventing leakage at this point.

Rising from the free ends of the swinging valve members 20' is a pair of apertured lugs 26. Loosely mounted between the lugs 26 is an operating handle 27 for the valve members 20'. Pins 28 in the lower end portion of the operating handle 27 are loosely engaged in the apertures in the lugs 26.

In operation, the swinging valve members 20' are actuated through the medium of the handle 27 for establishing communication between either of the outlets 19 and the manifold 18 through the tubes 23 and 24. The loose pivotal and sliding mounting of the valve members 20' on the lowermost spacer 17 permits limited independent movement of said valve members when the device is operated, whereby the accumulation of matter between the relatively stationary and moving parts will be prevented.

It is believed that the many advantages of a valve constructed in accordance with the present invention will be readily understood, and although preferred embodiments of the device are as illustrated and described, it is to be understood that further modifications and changes in the details of construction may be resorted to which will fall within the scope of the invention as claimed.

What is claimed is:

1. A valve of the character described comprising a pair of plates, elements securing the plates together in spaced, opposed relation, an intake manifold on one of the plates, the other of said plates having a plurality of outlets therein adapted to communicate with the manifold, a manually operable swinging valve member pivotally mounted on one of the elements and slidable between the plates for controlling the communication between the outlets and the manifold, and resilient means yieldingly urging the valve member against said other plate.

2. A valve comprising a pair of plates, elements securing said plates in spaced, opposed relation, one of the plates having a plurality of outlets therein, an intermediate plate loosely mounted on said elements for slight universal movement, said intermediate plate having openings therein aligned with the outlets, an intake manifold mounted on the other of the first-named plates, the branches of said manifold projecting into the openings in the intermediate plate in spaced relation to the walls of said openings, resilient sealing elements encircling the manifold branches between said other of the first-named plates and the intermediate plate, a manually operable valve member pivotally mounted on one of the elements between said one plate and the intermediate plate, and coil springs on the elements yieldingly urging the intermediate plate against the valve member and yieldingly urging said valve member against said one plate.

3. A valve comprising a pair of plates, means securing said plates in spaced, opposed relation to each other, an intake manifold on one of the plates, the other of said plates having a plurality of outlets adapted to communicate with the branches of the manifold, a pair of valve members pivotally mounted on one of the first-named means between the plates and slidable between said plates, said valve members for controlling the communication between the outlets and the manifold, coil springs between the valve members yieldingly urging said valve members outwardly against the plates, a female tube extending through one of the valve members, a male tube extending through the other valve member and into the female tube, said tubes arranged for alignment with either of the outlets and the adjacent branch of the manifold upon operation of the valve members, a sealing ring encircling the tubes between the valve members, and a hand lever connected to the members for actuating same.

CHARLES A. BERGMAN.